(12) United States Patent
Brinker et al.

(10) Patent No.: US 6,264,741 B1
(45) Date of Patent: Jul. 24, 2001

(54) SELF-ASSEMBLY OF NANOCOMPOSITE MATERIALS

(75) Inventors: C. Jeffrey Brinker, Albuquerque, NM (US); Alan Sellinger, Palo Alto, CA (US); Yunfeng Lu, New Orleans, LA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/449,036

(22) Filed: Nov. 24, 1999

Related U.S. Application Data
(60) Provisional application No. 60/110,039, filed on Nov. 25, 1998.

(51) Int. Cl.[7] .................................................. C30B 11/10
(52) U.S. Cl. .................................. 117/11; 117/68; 117/70
(58) Field of Search ................................. 117/11, 68, 70

(56) References Cited

U.S. PATENT DOCUMENTS

| | | | |
|---|---|---|---|
| 5,538,710 | * 7/1996 | Guo et al. | 423/701 |
| 5,607,686 | * 3/1997 | Totakura et al. | 424/426 |
| 5,858,457 | 1/1999 | Brinker et al. | 427/162 |
| 5,922,299 | 7/1999 | Bruinsma et al. | 423/355 |
| 5,925,330 | 7/1999 | Roth | 423/702 |

OTHER PUBLICATIONS

Merriam Webster Collegiate Dictionary, 10th ed. (Springfield MA: Merriam–Webster), 1997.*

Lu, Y., Fan, H., Stump, A., Ward, T., Rieker, T., and Brinker, C., "Aerosol–assisted self–assembly of mesostructured spherical nanoparticles," Nature, 1999, 398, 223–226.

Sellinger, A., Weiss, P., Nguyen, A., Lu, Y., Assink, R., Gong, W., and Brinker, C., "Continuous self–assembly of organic–inorganic nanocomposite coatings that mimic nacre," Nature, 1998, 394,256–260.

Ogawa, M., "Formation of novel oriented transparent films of layered silica–surfactant nanocomposites", J. Am. Chem. Soc., 1994, 116, 7941–7942.

Kleinfeld, E., and Ferguson, G., "Stepwise formation of multilayered nanostructural films from macromolecular precursors", Science, 1994, 265, 370–373.

* cited by examiner

*Primary Examiner*—Benjamin L. Utech
*Assistant Examiner*—Kin-Chan Chen
(74) *Attorney, Agent, or Firm*—Elmer A. Klavetter

(57) ABSTRACT

A method of making a nanocomposite self-assembly is provided where at least one hydrophilic compound, at least one hydrophobic compound, and at least one amphiphilic surfactant are mixed in an aqueous solvent with the solvent subsequently evaporated to form a self-assembled liquid crystalline mesophase material. Upon polymerization of the hydrophilic and hydrophobic compounds, a robust nanocomposite self-assembled material is formed. Importantly, in the reaction mixture, the amphiphilic surfactant has an initial concentration below the critical micelle concentration to allow formation of the liquid-phase micellar mesophase material. A variety of nanocomposite structures can be formed, depending upon the solvent evaporazation process, including layered mesophases, tubular mesophases, and a hierarchical composite coating composed of an isotropic worm-like micellar overlayer bonded to an oriented, nanolaminated underlayer.

26 Claims, 5 Drawing Sheets

SELF-ASSEMBLY OF NANOCOMPOSITE MATERIALS

This application claims the benefit of U.S. Provisional Application Ser. No. 60/110,039, filed on Nov. 25, 1998.

This invention was made with Government support under Contract No. DE-AC04-94AL85000 awarded by the Department of Energy. The Government has certain rights in the invention.

BACKGROUND OF THE INVENTION

The invention relates to a method for producing a nanocomposite self-assembly and the structured materials thereby produced and, more particularly, to an evaporation-induced self-assembly method for producing nanocomposite structures and the materials thereby produced.

The exceptional strength, hardness, and toughness of biological nanocomposite systems, composed of seemingly mundane materials, has fueled considerable attention from scientists of many disciplines. Natural nanocomposites, such as shell, are formed by biomineralization, a templated, self-assembly process in which pre-organized organic surfaces regulate the nucleation, growth, morphology and orientation of inorganic crystals. Efficient synthesis and processing of layered organic/inorganic nanocomposites that mimic bone and shell structures has been a goal of the materials chemist. The most highly studied material is that of abalone shell nacre which has an oriented coating composed of alternating layers of aragonite ($CaCO_3$) and biopolymer (~1 vol %). The organism fabricates the layers with precise microstructure to minimize pores and other defects. As a result, the bioceramic has esthetic qualities, smooth surface finishes and is 2-times harder and 1000-times tougher than its constituent phases.

In an attempt to mimic these examples from nature, a synthetic process termed "biomimetics" has gained momentum within the scientific community. Such approaches include crystallization beneath Langmuir monolayers, crystallization on self-assembled monolayers, supramolecular self-assembly (SSA), and sequential deposition (SD). Of these only SSA and SD offer the ability to introduce the periodic microstructural and compositional changes necessary for layered nanocomposite formation. Processes utilizing SSA have provided lamellar films but these structures collapse upon surfactant removal (Ogawa, M., J. Am. Chem. Soc., 1994, 116, 7941–7942). Stable inorganic/organic nanocomposites have been prepared with SD (see, Keinfeld, E. and Ferguson, G., Science, 1994, 265, 370–373) but this process has some experimental disadvantages as it requires many repeated deposition steps to build-up a practical coating thickness.

In forming structured materials, methods have been attempted which rely on evaporation-induced self-assembly by evaporating a component of the reaction system. For example, Bruinsma et al. (U.S. Pat. No. 5,922,299, issued on Jul. 13, 1999) describes an evaporative method of making films, fibers, and powders using an alkoxide silica precursor in a few minutes or less. Bruinsma et al. evaporate an aqueous solvent to form a structured mesoporous material but it is intentionally not a dense, non-porous film. Roth (U.S. Pat. No. 5,925,330, issued on Jul. 20, 1999) describes a method of producing a structured molecular sieve material by removing a templating surfactant, again a porous material. Brinker et al. (U.S. Pat. No. 5,858,457 issued on Jan. 12, 1999; incorporated herein by reference) describe a method for preparing mesostructured films by a solvent evaporation method using only a metal oxide, aqueous solvent and surfactant with an acidic or basic catalyst where controlled mesophase structures are prepared. Lu et al. (Lu, Y., Fan, H., Stump, A., Ward, T., Rieker, T. and Brinker, C., Nature, 1999, 398, 223–226; incorporated herein by reference) show that porous, mesostructured spherical nanoparticles can be formed within several seconds by an evaporation-induced interfacial self-assembly method.

Useful would be an efficient and simple method wherein organized inorganic/organic nanocomposite materials with little porosity can be formed within a few minutes or less. Such nanocomposite materials would have organized, polymerized phases which would lead to enhanced structural stability. Sellinger et al. (Sellinger, A., Weiss, P., Nguyen, A., Lu, Y., Assink, R., Gong, W., and Brinker, C., Nature, 1998, 394, 256–260; incorporated herein by reference) describe a method of producing such nanocomposite materials by an efficient evaporation-induced, self assembly process that results in simultaneous organization of both organic and inorganic phases to form many layers of the nanocomposite material.

SUMMARY OF THE INVENTION

According to the present invention, a method of making a nanocomposite self-assembly is provided where at least one hydrophilic compound, at least one hydrophobic compound, and at least one amphiphilic surfactant are mixed in a solvent consisting essentially of a polar organic compound and water, and where the amphiphilic surfactant has an initial concentration below the critical micelle concentration, to form a homogeneous solution. A portion of the solvent is evaporated to organize the hydrophilic compound and the hydrophobic compounds to form a self-assembled liquid crystalline mesophase material which can then be polymerized to form a nanostructure self-assembly assembly. A coupling agent can be added to enhance coupling between the hydrophilic and hydrophobic compounds. An initiator can be added to facilitate the polymerization step. Various polymerization methods can be utilized, including the use of ultra-violet radiation, thermal treatment, catalytic treatment, and aging. The polymerized material can be washed to remove surfactant and any residual unpolymerizated material.

In one embodiment, a method of making a nanocomposite self-assembly is provided comprising mixing a silica sol with a coupling agent, a surfactant, a monomer and an initiator in an aqueous, polar organic solvent with an initial surfactant concentration below the critical micelle concentration, evaporating the polar organic solvent and water to induce micelle formation and subsequent nanocomposite self assembly; and means for inducing polymerization to form the nanocomposite self assembly.

DETAILED DESCRIPTION OF THE INVENTION

Figure 1:
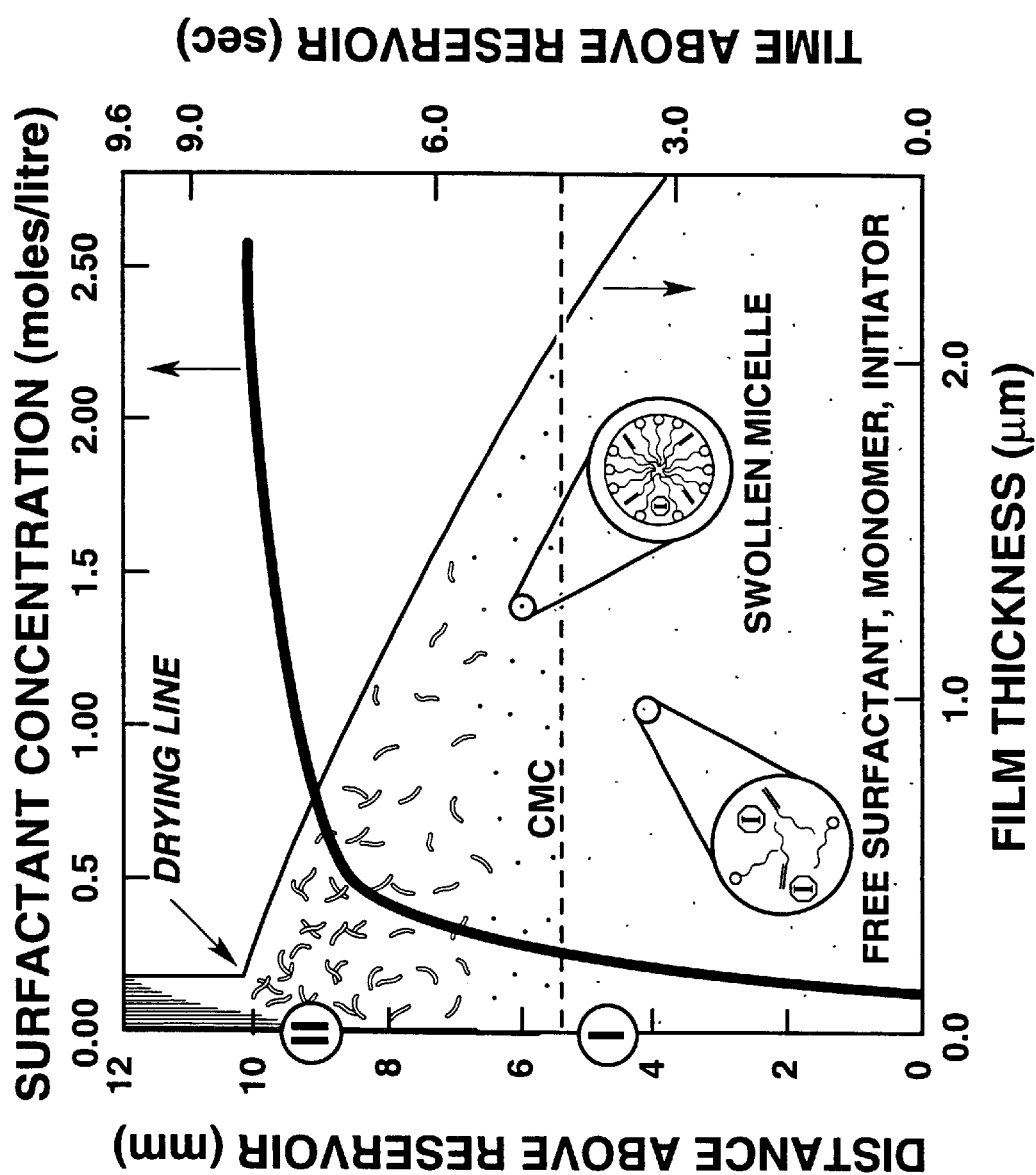
FIG. 1 shows a schematic of the method of making nanocomposite self-assembled materials through preferential evaporation.

The present invention exploits the amphiphilic nature of surfactant molecules to simultaneously organize inorganic and organic precursors into highly-ordered nanostructured films and particles in a rapid, evaporation-driven, self-assembly process. The resulting materials are nanocomposite materials prepared with 1-, 2-, or 3-dimensional connectivity of the constituent phases. The nanocomposite materials can be hybrid organic-inorganic materials, such as polymer/metal oxide or polymer/metal materials, or inorganic-inorganic materials, such as metal oxide/metal materials.

Rather than using tedious layer-by-layer assembly processes, the present invention relies on evaporation to induce the formation of micelles that spatially partition and organize hydrophobic precursors (within the hydrophobic micellar interiors) and hydrophilic precursors (surrounding the hydrophilic micellar exteriors). Subsequent self-assembly of the micellar species into a lamellar liquid crystalline mesophase simultaneously organizes the hydrophobic and hydrophilic precursors into the desired nanolaminated form, creating hundreds of layers in a single step. This evaporation-induced self-assembly (EISA) approach can be extended to form nanostructured particles during aerosol processing and to form hexagonal, cubic, or disordered bicontinuous nanocomposite mesophases.

The present invention avoids time-consuming multi-step procedures such as sequential deposition used to prepare nanolaminates and vapor- or liquid-infiltration treatments used to prepare three-dimensional composite constructions. Furthermore self-assembly represents a robust process endowed with self-healing characteristics (prior to polymerization) which should result in improved performance compared to traditionally-prepared composite materials.

The present invention demonstrates an efficient self-assembly method to prepare nanolaminated coatings that mimic the structure of shell. Compared to SD processes, the evaporation-induced partitioning and self-assembly inherent to the method of the present invention allows simultaneous organization of the hydrophobic (e.g., organic) precursors and hydrophilic (e.g., inorganic) precursors, so that hundreds or even thousands of layers form quickly and essentially simultaneously. Compared to other nanocomposite self-assembly methods, the present invention achieves higher inorganic loadings, and the continuous nature of the dip-coating process described enables rapid formation of optically-transparent coatings suitable for applications such as automotive finishes, hard coats, and optical hosts. Extension of this process to other materials combinations, e.g. inorganic/metal or inorganic/conductive polymer, enables the formation of nanocomposites of interest for high capacitance devices, catalysis, and quantum optics or electronics.

The present invention is both a method of making a nanocomposite self-assembly and the structured materials thereby produced. In the method of making the nanocomposite self-assembly, a hydrophobic precursor compound and a hydrophilic precursor compound are mixed with a surfactant, with the initial surfactant concentration importantly below that of the critical micelle concentration (cmc), in a solvent to form a homogeneous solution. If the surfactant concentration is greater than the cmc, then precipitation of bulk reactants can occur and prevent the nanocomposite self-assembly of homogeneous films prepared according to the method of the present invention. The solvent, such as a polar organic liquid/water system, is then evaporated to simultaneously organize the hydrophilic and hydrophobic precursor compounds and surfactant into highly-ordered, self-assembled liquid crystalline mesophase materials. These materials are then polymerized to develop a stable nanocomposite self-assembly. The evaporation process, as well as the choice of amphiphilic surfactant molecules or block co-polymers, determines the final structure and characteristics of the nanocomposite self-assembly material. An advantageous of the method of the present invention is that more than one hydrophilic compound, hydrophobic compound, surfactant, or solvent can be utilized in the mixture to aid in tailoring the properties of the resulting nanocomposite self-assembly material.

In one embodiment, the present invention is a method of making an efficient polymer/silica nanocomposite self-assembly based on a simple spin or dip-coating procedure and the materials thereby produced. The nanocomposite assembly method of the present invention starts with a homogeneous solution of a hydrophilic compound, such as an inorganic soluble silicate, at least one surfactant, and at least one hydrophobic compound, such as an organic monomer, prepared in polar organic/water solvent with an initial surfactant concentration ($c_0$) below the critical micelle concentration (cmc).

The hydrophilic compound can be any compound which exhibits hydrophilic characteristics and which is soluble in the polar organic/water solvent used. Hydrophilic compounds which may be used include inorganic soluble silicate such as tetraethylorthosilicate, 7-octenyltrimethoxysilane, and methacryloxypropyl trimethoxysilane. Other hydrophilic compounds include alkali nitrates, magnesium acetates, titanium and zirconium amines, acetylacetonates, alkaline earth acetates, and metal acetates. The hydrophobic compound is, in general, polymerizable and includes organic monomers, such as methacrylates, functionalized styrene monomers, and 1,6-hexanediol dimethyacrylate, and alkoxide compounds, including alkali alkoxides, magnesium arylalkoxides, titanium alkoxides, zirconium alkoxides, alkaline earth alkoxides, and fluorinated metal alkoxides.

The surfactant can be anionic, cationic, nonionic, or a block copolymer. Anionic surfactants that can be used include, but are not limited to, sulfates, sulfonates, phosphates, and carboxylic acids. Cationic surfactants that can be used include, but are not limited to, alkylammonium salts, gemini surfactants, cetylethylpiperidinium salts, and dialkyldimethylammonium. Nonionic surfactants that can be used, with the hydrophilic group not charged, include, but are not limited to, primary amines, poly(oxyethylene) oxides, octaethylene glycol monodecyl ether and octaethylene glycol monohexadecyl ether. The polar organic/water solvent can be any general polar organic solvent soluble in water, such as an alcohol/water solvent, an aqueous formamide, or a tetrahydrofuran/water solvent.

Generally, at least one coupling agent and at least one initiator is included in the solution. The coupling agent is included to covalently bond the inorganic and organic reagents to provide a stronger assembly system. The coupling agent can be included to increase the strength and toughness characteristics of the assembly system but is not required. Coupling agents commonly used include 7-octenyltrimethoxysilane or methacryloxypropyl trimethoxysilane. The initiator is included to initiate or enhance the subsequent polymerization process. A common initiator when using ultraviolet radiation to induce polymerization is benzoin dimethylether. A common initiator when heating the system to induce polymerization is 1,1'-azobis (1-cyclohexane carbonitrile). Another common initiator is 4,4'-azobis(4-cyanovaleric acid). With many hydrophilic and hydrophobic compounds used, polymerization can occur with simple aging, but the polymerization process can be advantageously enhanced with the addition of initiator compounds.

During spin- or dip-coating, or other common deposition processes, preferential evaporation of the polar organic/water solvent induces micelle formation that spatially partitions and organizes hydrophobic but polar-organic-soluble precursors within the hydrophobic micellar interiors and hydrophobic precursors surrounding the hydrophilic micellar exteriors. Continued evaporation of primarily water then induces self-organization into nanocomposite liquid crystalline mesophases. Control of the environmental conditions, particularly humidity, will determine the fraction of solvent evaporated and can affect structural characteristics. During solvent evaporation, organic monomers and initiators soluble in the polar organic compound migrate into the hydrophobic portion of the forming micelles. Continued evaporation of both the polar organic compound and water promotes cooperative assembly of these micellar species into interfacially-organized liquid crystalline (LC) mesophases. The self-assembly of these micellar species into a lamellar liquid crystalline mesophase efficiently organizes the hydrophobic and hydrophilic precursors into the desired nanolaminated form, creating many hundreds of layers in a single step. This organizes both the hydrophobic and hydrophilic precursors simultaneously into the desired structure in a rapid (approximately 10 seconds) continuous process. Polymerization, such as photo-induced, thermally-induced, catalytic-induced or aging-induced polymerization, can then be used to lock-in the nanocomposite architecture and covalently bond the organic-inorganic interface. When the precursor compound is organic, photo-induced or thermally-induced polymerization is generally used. When the precursor compound is inorganic, catalytic-induced, thermally-induced or aging-induced polymerization can be used. Through variation of the nature of the amphiphilic surfactant and its concentration, various structures, such as hexagonal or cubic nanostructures (exhibiting 1- and 3-dimensional connectivity of the constituent phases, respectively), can be produced and the characteristic dimension (d-spacing) of the composite architecture controlled. Through variation of the organic and inorganic precursors, a wide range of materials combinations can be prepared.

In a typical preparation using an organic precursor compound and an inorganic precursor compound, an initial silica sol (A2) was prepared by refluxing TEOS [$Si(OCH_2CH_3)_4$], ethanol, water and dilute HCl at 60° C. for 90 minutes. The sol was subsequently diluted with ethanol (1:2) followed by addition of water and dilute HCl. The A2 acid concentration and reaction time were adjusted so as to minimize the size and condensation rate of the silica species. Coupling agent (7-octenlytrimethoxysilane, OTS, or methacryloxypropyl trimethoxysilane, MPS) was added followed by surfactant cetyltrimethylammonium bromide (CTAB), the hydrophobic monomer dodecylmethacrylate (DM), a cross-linker agent, hexanedioldimethacrylate (HDM), and an initiator (when using ultraviolet radiation (UV), benzoin dimethylether (BME), was added; when using thermally-induced polymerization, 1,1'-azobis(1-cyclohexane carbonitrile) (ACHN) was used). The final reactant mole ratios were 1 TEOS:22 EtOH: 5 $H_2O$:0.004 HCl:0.21 surfactant:0.16 DM:0.02 HDM:0.08 OTS:0.02 initiator.

Coatings were deposited on polished (100)-silicon, mica, or glass slides by dip-coating, during which time the evaporation-induced self assembly occurs. Thicker coatings required for spectroscopic measurements were prepared by dispensing sol in a petri dish followed by immediate vertical draining. After deposition, the coatings were heated or irradiated with UV light (Hg arc lamp source with filter providing 260–320 nm wavelength and 20 mW/cm$^2$ power) to initiate organic polymerization. Short exposures to ammonia vapor (2–5 min) were employed to promote further condensation of the silica framework. Alternatively, acids and fluoride-containing compounds can be used to promote silica polymerization or condensation. Polymerized coatings were washed sequentially with ethanol, acetone, and diethyl ether to remove surfactant and residual unpolymerized species.

FIG. 1 shows a schematic of the evolution of these structures through preferential evaporation during dip-coating. FIG. 1 shows the steady-state film-thinning profile established by evaporation with vertical axes representing distance/time above sol reservoir surface and horizontal axes, film thickness/surfactant concentration. Preferential alcohol evaporation progressively increases the surfactant concentration, inducing micellization and concurrent incorporation of monomer and initiator into the micellar interior. In the section near (I), the surfactant bi-layer formation occurs below cmc and provides an organized surface for subsequent cooperative assembly of the lamellar mesophase. A bi-layer structure of this type was imaged using a non-contact atomic force microscopy technique following equilibration (1 hour) of the silicon substrate with a silica-surfactant sol prepared with $c_o$=5 wt % but without addition of organic monomer/initiator. Step height created by scraping the bi-layer with the AFM tip is consistent with a CTAB bi-layer. In the section near (II), the chemical and structural characteristics of the coupling agent, monomers, and initiators influence the local effective packing parameter of the surfactant and hence the organization of the hybrid mesophase.

Figure 2:
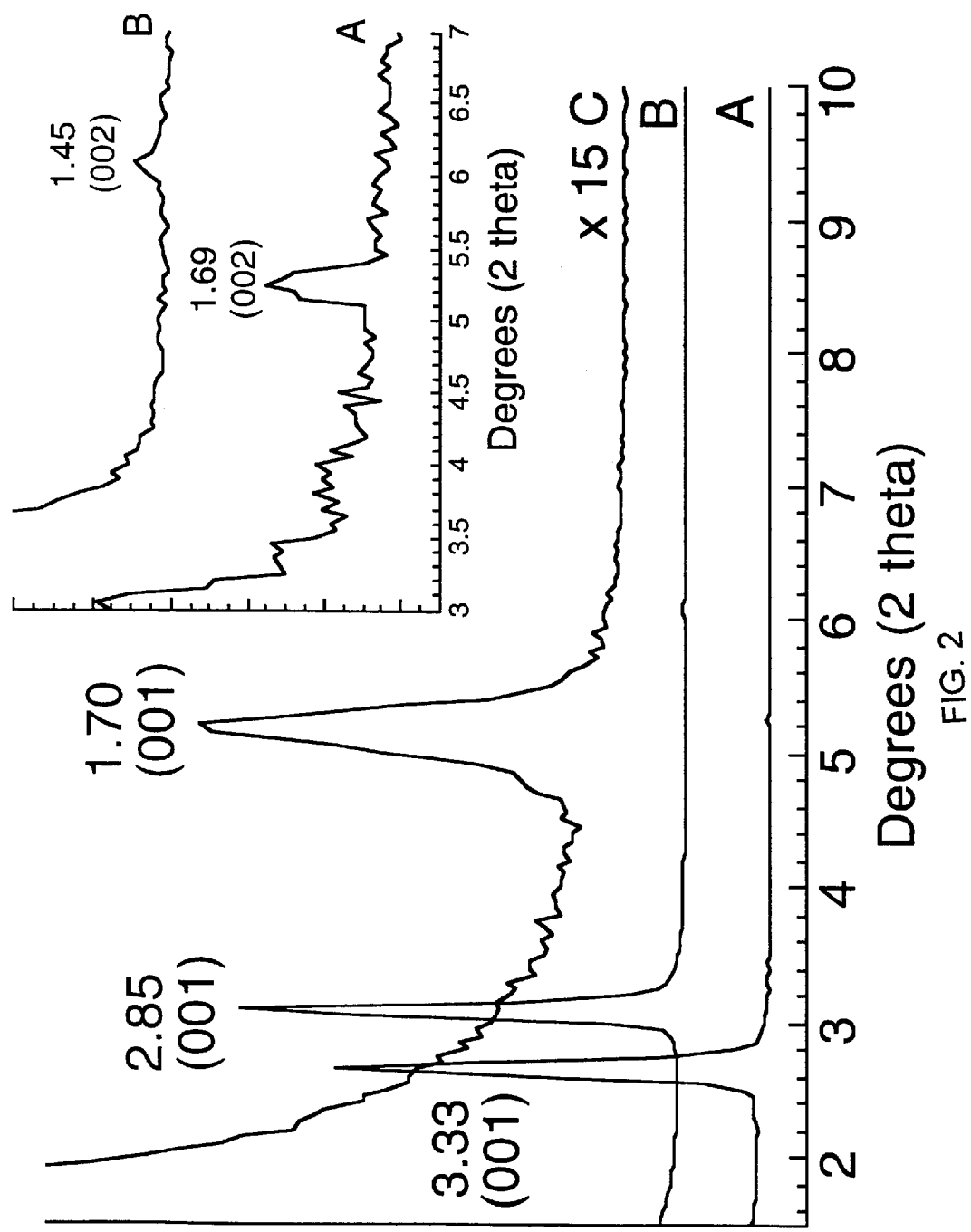
FIG. 2 shows XRD patterns corresponding to UV-initiated polymerized self-assembled systems.
Figure 3:
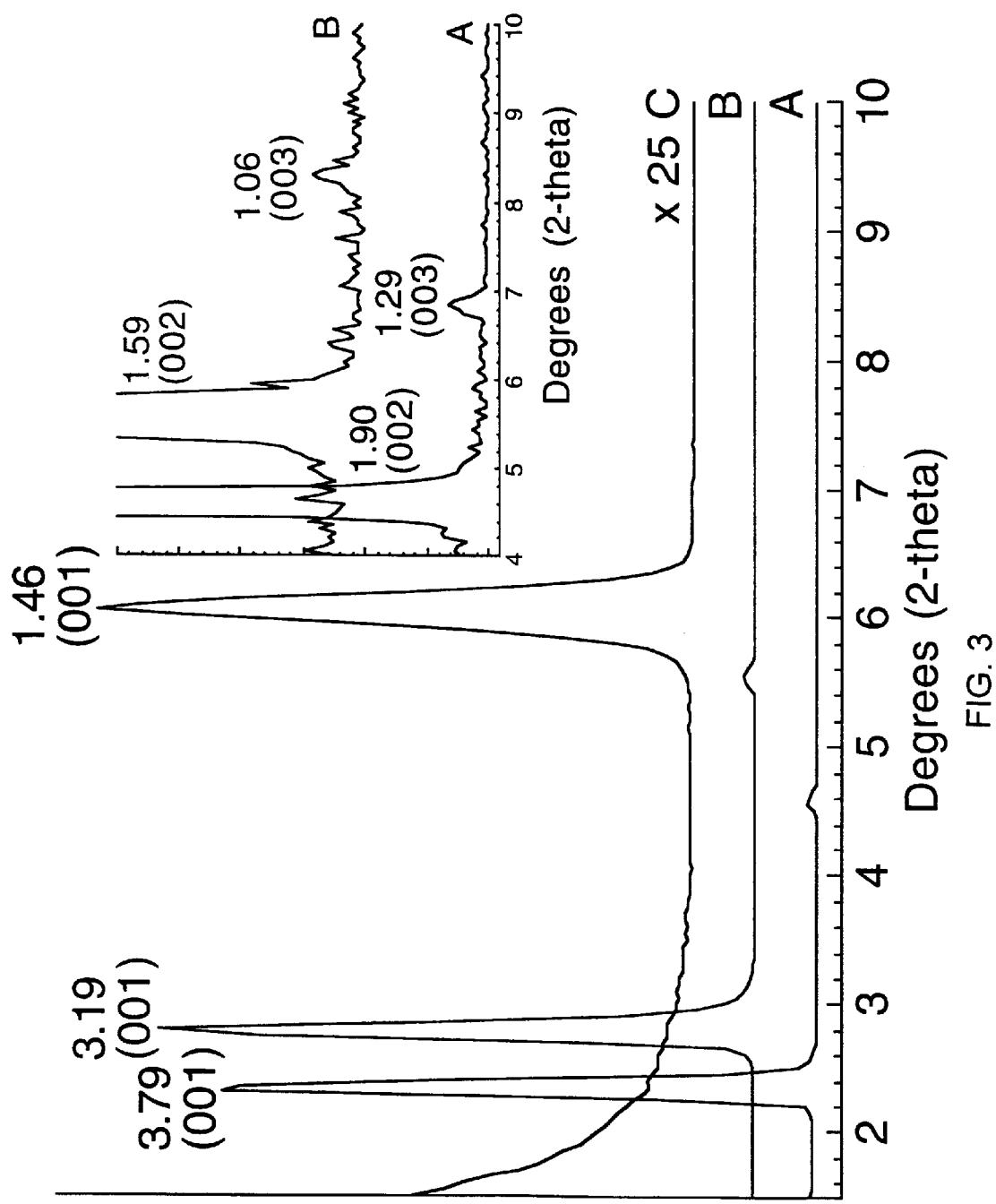
FIG. 3 shows XRD patterns corresponding to thermally-initiated polymerized self-assembled systems.

FIG. 2 and FIG. 3 show X-ray diffraction (XRD) patterns corresponding to UV-initiated and thermally-initiated polymerization systems, respectively. Patterns were recorded on a Siemens D500 diffractometer using Ni-filtered CuKα radiation with $\lambda$=1.5418 Å in $\theta$–$2\theta$ scan mode. Trace A is the pattern of the as-deposited coating and is consistent with a (001)-oriented lamellar phase with basal spacing c=3.33– nm. Trace A and B (polymerized) contain second and third order reflections indicative of a lamellar liquid crystalline mesophase. The lamellar mesostructure is maintained during polymerization and washing, with associated basal spacing reductions to c=2.85 and 1.70 nm, respectively. The reduction of approximately 14% in the basal cell dimension of the polymerized film (B) is consistent with shrinkage in methacrylate-based polymerization systems. Trace C shows the pattern for polymerized and washed samples which have an additional shrinkage of approximately 40% which is explained by surfactant and residual monomer removal after washing in ethanol, acetone, and diethylether.

Figure 4:
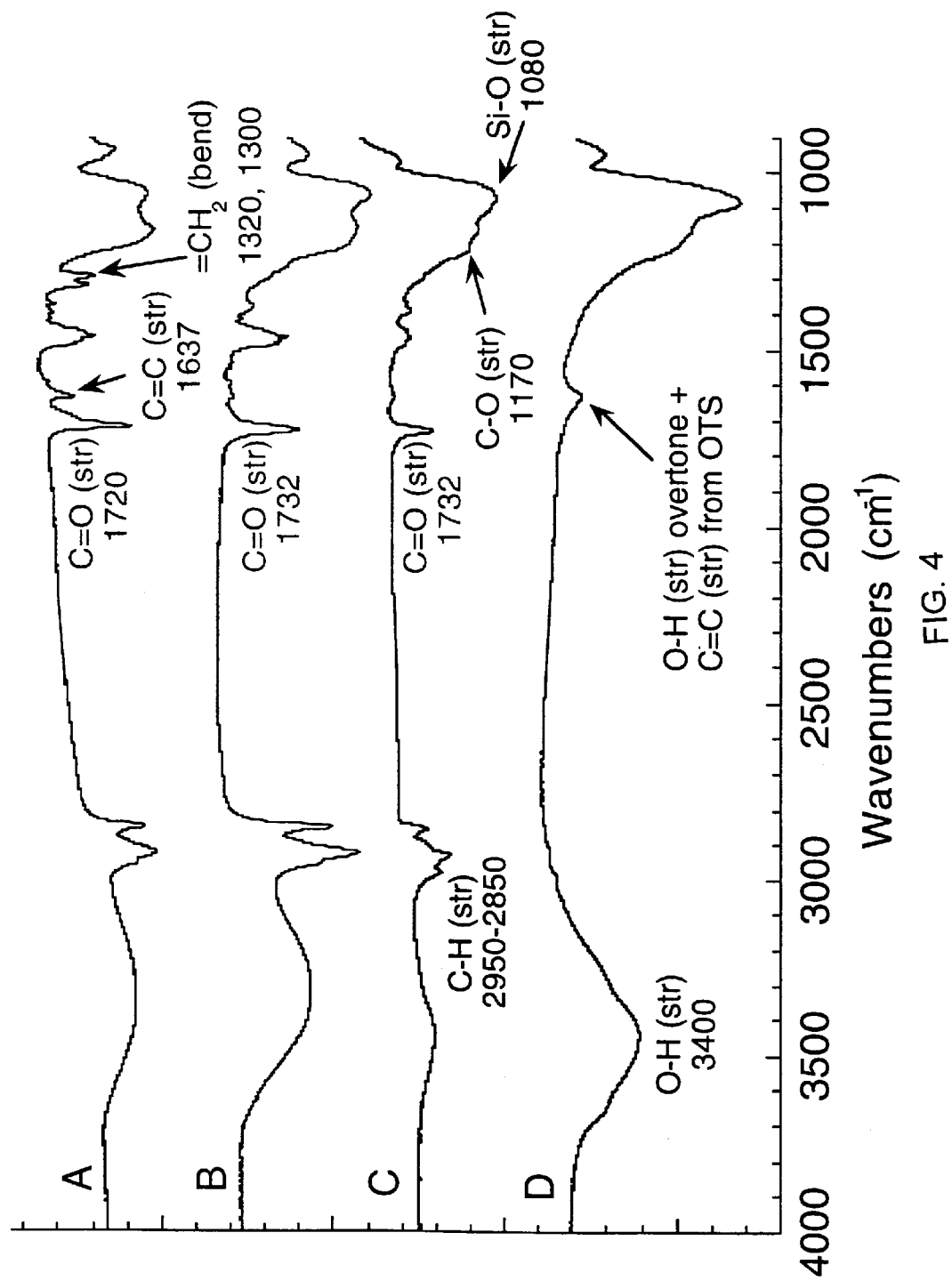
FIG. 4 shows FTIR spectra corresponding to successive stages of nanocomposite formation.

FIG. 4 shows a series of FTIR spectra corresponding to the successive stages of nanocomposite formation for the UV-initiated polymerization system: A, as-prepared (unpolymerized); B, polymerized (UV-irradiated); C, polymerized and washed; D, polymerized, washed, and treated with ammonium biflouride to selectively etch the silica lamellae, and E, as-prepared and washed (without polymerization). Three distinct features are observed that provide evidence of organic polymerization within the nanocomposite. The C=C stretch (1640 cm$^{-1}$) of the monomer and OTS virtually disappears after UV exposure indicating C=C, C—C conversion. The C=O stretching vibration in the unpolymerized film is shifted from 1720 to 1735 cm$^{-1}$ after UV exposures, consistent with methacrylate polymerization (conjugated vs. unconjugated C=O stretch). The line width of the C=O stretching peak in the polymerized film is much narrower than that of even low molecular weight polydodecylmethacrylate polymerized independently as a thin film in the presence of CTAB. This suggests that the polymerization occurs within the confined geometry of the interlamellar galleries. Otherwise the randomized distribution of C=O would give rise to broader line widths.

Further support for organic polymerization is found from $^{13}$C NMR, thermal analysis, and N$_2$ sorption studies. $^{13}$C CP-MAS spectra (100.6 MHz, 2 ms CP time, 1024 scans) showing resonances at approximately 114–140 ppm assigned to sp$^2$ hybridized carbons of C(CH$_3$)=CH$_2$ (DM) and CH=CH$_2$, (OTS) virtually disappeared through conversion to sp$^3$ hybridization during polymerization. This demonstrates direct covalent linkages of DM to silica via vinyl-methacrylate group co-polymerization. The presence of residual vinyl resonances in B is not surprising as their reactivity is much less than that of methacrylates in this system.

Differential scanning calorimetry (DSC) of the unpolymerized, thermally-initiated material shows an onset of polymerization at 85° C. and an exotherm centered at 120° C., consistent with methacrylate polymerization in nanocomposite systems. DSC studies of the lamellar nanocomposite powders show an absence of a glass transition (Tg) for the polymer, indicative of polymer confined in the narrow interlamellar galleries.

Nitrogen sorption indicates a 350% increase in BET surface area and 270% increase in pore volume after oxidative calcination (550° C. for 3 hours in air) of exhaustively washed nanocomposites compared to 18 and 10%, respectively, for control samples prepared without polymer. The associated weight loss due to oxidative calcination corresponds to a ceramic yield of 51.7 wt %, which is within 3.5% of the theoretical value expected from the stoichiometry of the non-volatile constituents. These combined results indicate that organic monomer is efficiently incorporated in the interlamellar galleries where it is polymerized to form the desired interfacially bonded nanocomposite.

Evidence of inorganic polymerization is obtained from $^{29}$Si MAS NMR. Integration of the envelop of peaks corresponding to the resonances of Q$^2$, Q$^3$, and Q$^4$ silicon species shows that ammonia exposure causes the overall extent of siloxane condensation to increase from 80.2 to 88.4% (Q2/Q3/Q4 ratios change from 0.34/1.86/1.00 to 0/0.87/1.00) and the extent of trisiloxane condensation (associated with the OTS coupling agent) to increase from 68.2 to 95.5%.

Nano-indentation measurements performed on polydodecylmethylacrylate (PDM)/silica, poly(4-methylstyrene)/silica and poly(4-vinylbenzylchloride)silica nonolaminates prepared with ~50 wt % polymer show a 3 to 7-fold increase in indentation hardness (from 0.1–0.4 GPa to 0.8–1.0 GPa) due to combined organic/inorganic polymerization.

The described analytical data clearly demonstrate that a nanocomposite assembly is formed by the method of the present invention with both the organic (hydrophobic) and inorganic (hydrophilic) phases of this embodiment polymerizing, yielding a robust and stable material.

Figure 5:
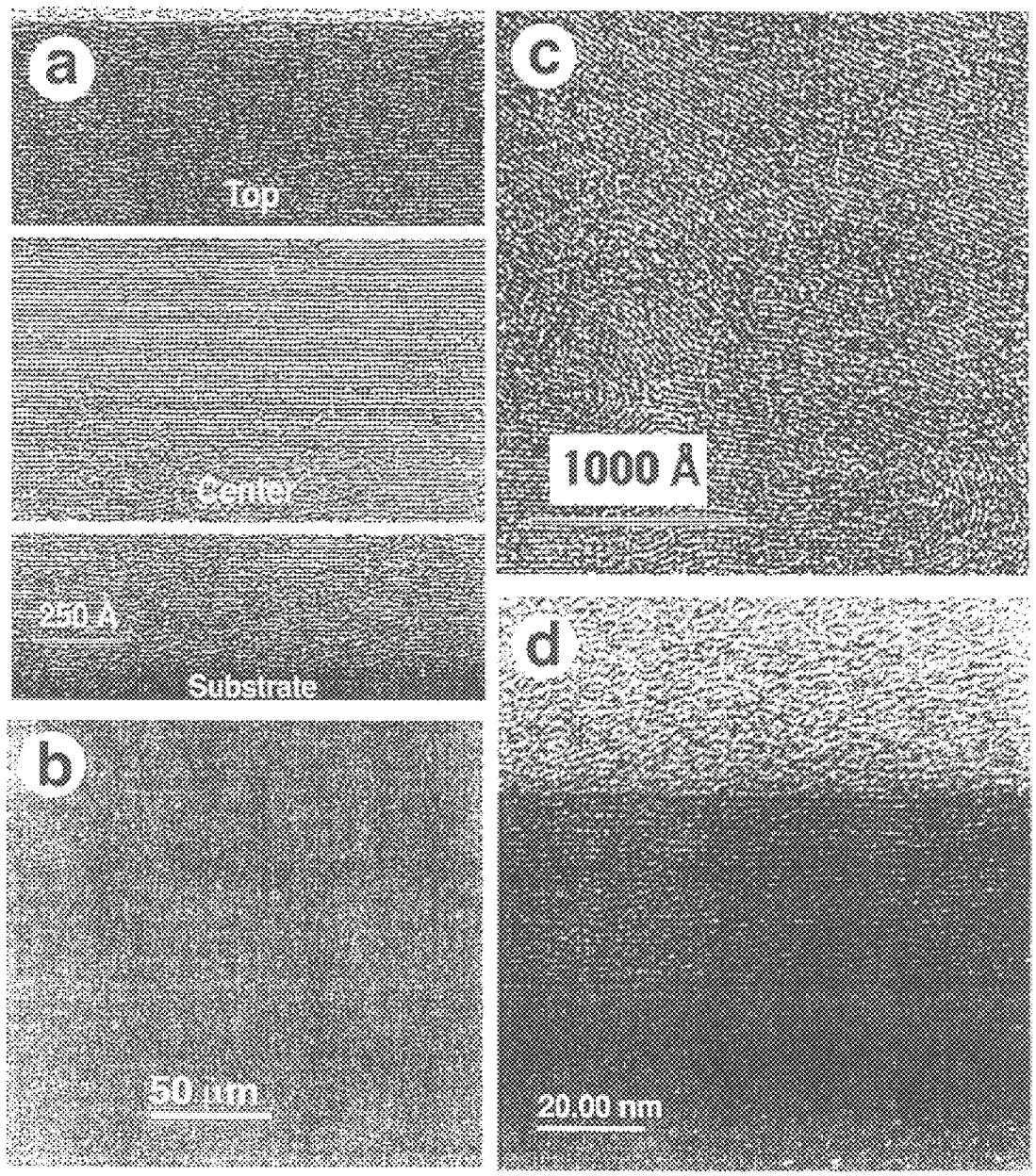
FIG. 5 shows electron micrographs of nanocomposite coatings.

The electron micrographs in FIG. 5 illustrate the diversity of structures attainable by the method of the present invention. FIG. 5a shows a TEM cross-section of the nanolaminated composite structure. Similar to shell, a highly c-axis oriented coating composed of successive layers of inorganic and organic polymers is achieved. FIG. 5b shows a corresponding plan-view SEM image, indicating that the nanocomposite coatings are featureless on micrometer length scales. FIG. 5c shows a swirling pattern of organized tubules typical of hexagonal mesophases, and FIG. 5d shows a portion of a hierarchical composite coating composed of an isotropic worm-like micellar overlayer bonded to an oriented, nanolaminated underlayer.

We claim:

1. A method of making a self-assembled liquid crystalline mesophase material, comprising:
   admixing at least one hydrophilic compound, at least one hydrophobic compound, and at least one surfactant in a solvent consisting essentially of a polar organic compound and water, wherein said surfactant has an initial concentration below the critical micelle concentration, to form a homogeneous solution; and
   evaporating a portion of the solvent to organize the at least one hydrophilic compound and the at least one hydrophobic compound to form a self-assembled liquid crystalline mesophase material.

2. The method of claim 1 further comprising the step of polymerizing the self-assembled liquid crystalline mesophase material to form a nanostructure self-assembly.

3. The method of claim 2 wherein at least one coupling agent is admixed into the homogeneous solution.

4. The method of claim 3 wherein at least one initiator is admixed into the homogeneous solution.

5. The method of claim 4 wherein the least one initiator is selected from the group consisting of benzoin dimethylether, 1,1'-azobis(1-cyclohexane carbonitrile), and 4,4'-azobis(4-cyanovaleric acid).

6. The method of claim 3 wherein the at least one coupling agent is selected from the group consisting of 7-octenyltrimethoxysilane and methacryloxypropyl trimethoxysilane.

7. The method of claim 2 wherein the polymerization of the self-assembled liquid crystalline mesophase material to form a nanostructure self-assembly occurs by a process selected from the group consisting of aging, heating, catalysis, and irradiation.

8. Method of claim 2 wherein the nanostructure self-assembly is washed with a solvent to remove surfactant.

9. The method of claim 2 wherein the nanostructure self-assembly has a layered structure.

10. The method of claim 2 wherein the nanostructure self-assembly has a tubular structure, wherein the tubular structure is derived from a disordered or hexagonal mesophase.

11. The method of claim 2 wherein the nanostructure self-assembly has a cubic mesophase structure.

12. The method of claim 2 wherein the nanostructure self-assembly has a bicontinuous mesophase structure.

13. The method of claim 2 wherein the nanostructure self-assembly has an isotropic worm-like overlayer bonded to an oriented, nanolaminated underlayer.

14. The method of claim 1 wherein evaporating a portion of the solvent is performed by spin-coating or dip-coating onto a substrate.

15. The method of claim 1 wherein the at least one hydrophilic compound is selected from the group consisting of tetraethylorthosilicate, 7-octenyltrimethoxysilane, methacryloxypropyltrimethoxysilane, alkali nitrates, magnesium acetates, titanium amines, zirconium amines, acetylacetonates, alkaline earth acetates, and metal acetates.

16. The method of claim 1 wherein the at least one hydrophobic compound is selected from the group consisting of organic monomers and alkoxide compounds.

17. The method of claim 16 wherein the organic monomer is selected from the group consisting of methacrylates, functionalized styrene monomers, and 1,6-hexanediol dimethyacrylate.

18. The method of claim 16 wherein the alkoxide compounds are selected from the group consisting of alkali alkoxides, magnesium arylalkoxides, titanium alkoxides, zirconium alkoxides, alkaline earth alkoxides, and fluorinated metal alkoxides.

19. The method of claim 1 wherein the at least one surfactant is selected from the group consisting of sulfates, sulfonates, phosphates, carboxylic acids, alkylammonium salts, cetylethylpiperidinium salts, dialkyldimethylammonium, primary amines, poly(oxyethylene) oxides, octaethylene glycol monodecyl ether, octaethylene glycol monohexadecyl ether and block copolymers.

20. The method of claim 1 wherein the formation of the self-assembled liquid crystalline mesophase material occurs in less than approximately one minute.

21. A method of making a nanocomposite self-assembly, comprising:
admixing a silica sol with at least one coupling agent, at least one surfactant, at least one monomer and at least one initiator in an aqueous, polar organic solvent with an initial surfactant concentration below the critical micelle concentration;
evaporating said polar organic solvent to induce micelle formation and form a liquid mesophase material; and
polymerizing the micelle formation to form a nanocomposite self assembly.

22. The method of claim 21 wherein the silica sol is prepared by refluxing $Si(OCH_2CH_3)_4$, ethanol, water, and hydrochloric acid.

23. The method of claim 22 wherein the coupling agent was 7-octenyltrimethoxysilane and the monomer was dodecylmethacrylate.

24. The method of claim 23 wherein the $Si(OCH_2CH_3)_4$, ethanol, water, hydrochloric acid, surfactant, 7-octenyltrimethoxysilane and dodecylmethacrylate were mixed in the molar ratios of 1 $Si(OCH_2CH_3)_4$:22 ethanol: 5 water: 0.004 HCl: 0.21 surfactant: 0.16 dodecylmethacrylate: 0.08 7-octenyltrimethoxysilane.

25. The method of claim 22 wherein the coupling agent is selected from the group consisting of 7-octenyltrimethoxysilane and methacryloxypropyl trimethoxysilane.

26. The method of claim 21 wherein the surfactant is cetyltrimethylammonium bromide.

* * * * *